United States Patent
Voss

[15] 3,648,311
[45] Mar. 14, 1972

[54] ROTARY CONNECTOR FOR CONNECTING THE ENDS OF MULTIPLE CONDUITS

[72] Inventor: Siegfried Voss, Bremerhaven, Germany
[73] Assignee: Aktien-Gesellschaft "Weser", Breman, Germany
[22] Filed: Aug. 25, 1969
[21] Appl. No.: 852,729

[30] Foreign Application Priority Data

Aug. 24, 1968 Germany ............P 17 75 549.6

[52] U.S. Cl. ................................9/8 P, 141/387, 285/134, 285/331, 285/DIG. 13
[51] Int. Cl. ..................................B63b 21/52, F16l 39/04
[58] Field of Search.................285/134, 136, 137, 331, 272; 9/8 P; 114/.5 T; 141/387, 388

[56] References Cited

UNITED STATES PATENTS

| | | | |
|---|---|---|---|
| 2,404,494 | 7/1946 | Halby et al. | 285/134 X |
| 2,894,268 | 7/1959 | Griebe | 9/8 P |
| 3,077,615 | 2/1963 | Schultz | 9/8 P |
| 3,372,715 | 3/1968 | Ashton | 141/387 X |
| 1,414,174 | 4/1922 | Campos | 285/331 X |
| 2,626,166 | 1/1953 | Fawick | 285/134 |
| 3,187,355 | 6/1965 | Wassenaar et al. | 285/136 X |
| 3,414,918 | 12/1968 | Petrie et al. | 285/134 X |
| 3,449,839 | 6/1969 | Crist | 285/134 X |

FOREIGN PATENTS OR APPLICATIONS 485,885  5/1938  Great Britain ........................285/272

*Primary Examiner*—Thomas F. Callaghan
*Attorney*—Michael S. Striker

[57] ABSTRACT

A rotary connector for connecting the ends of multiple conduits associated with buoys and analogous floating platforms for transporting flowable matter from ship to shore, and vice versa. A housing has two substantially cup-shaped sections whose respective open sides face one another. The sections are internally subdivided into a plurality of concentric discrete compartments with each compartment of one section communicating with a corresponding compartment of the other section. Connecting means fluid-tightly connects the housing sections to one another, with freedom of rotation of the sections relative to one another and with fluidtight connection of the communicating compartments with one another. Inlets are provided on one of the housing sections each communicating with one of the compartments thereof and outlets are provided on the other of the housing sections each communicating with one of the compartments of this other housing section.

7 Claims, 4 Drawing Figures

PATENTED MAR 14 1972 3,648,311

INVENTOR
SIEGFRIED VOSS
BY
ATTORNEY

ROTARY CONNECTOR FOR CONNECTING THE ENDS OF MULTIPLE CONDUITS

BACKGROUND OF THE INVENTION

The present invention relates generally to a rotary connector for connecting the ends of multiple conduits, and more particularly to a rotary connector for connecting the ends of multiple conduits which meet at or on a buoy or analogous floating platform so that flowable matter may be conveyed from the shore to the buoy and from there via the rotary connector and suitable conduits to a ship, or vice versa, i.e., as shown in the British Pat. No. 977,438.

It is already known to resort to such conveying of liquids and flowable matter in general. This is done to make it possible to anchor a ship offshore and to load it or unload it without necessity of having a ship come ashore. In many cases it is not possible for the ship to come ashore because facilities for docking are lacking, and in other cases it is more economical to resort to this type of loading or unloading operation. Conventionally, such arrangements include conduits which extend from shore through the water to a selected offshore location at which there is provided a water-based support in the form of bollards, floating platforms, floating buoys or the like. Of course, if platforms or buoys are used, they will be suitably anchored. Whatever support is used, it supports the ends of the conduits extending outward from the shore, as well as the ends of additional conduits which extend from the respective support to a ship to be loaded or unloaded and which communicate with the conduits extending outwardly from the shore. The ship itself is usually also secured to the support for the duration of the loading or unloading operation.

The advantage of these arrangements is in the fact that on the one hand they permit loading and unloading where there are no harbor installations capable of allowing a ship to come to shore, and on the other hand they eliminate the necessity for such harbor installations in many cases while still making possible bunkering as well as loading and unloading. In fact, in many cases, the bunkering and loading and unloading of large ships is only possible by way of these arrangements.

As a rule, the conduits which are provided in these arrangements include several conduits for loading and/or unloading, as well as additional conduits for bunkering of fuel oil, lubricants, water and the like. In order to prevent intertwining and possible rupturing of the different conduits when the ship—which is secured to the support—constantly moves about the support as a result of wind, currents or the like, it is necessary to provide specially constructed rotary connectors for the conduits where the land-based conduits—that is those extending outwardly from the shore—meet the ship-based conduits—that is those extending from the ship to the buoy or other support. Usually, these rotary connectors comprise a central hollow chamber which is firmly secured to the support and subdivided by suitable wall means into a plurality of vertical channels corresponding to the number of conduits involved. At the lower ends each of these channels communicates with one of the conduits extending from the support to shore whereas the upper ends of the channels communicate with respective conduits extending from the support to the ship. The outlet openings where the channels communicate with these latter conduits are vertically staggered and each surrounded by an annular housing which can turn about the central chamber and is sealed with respect to the latter. Other constructions are also known. All of them, however, suffer from certain disadvantages. Among these is the fact that they are rather complicated and therefore expensive and subject to breakdown. A further disadvantage is the fact that these known constructions are of relatively great height. This latter disadvantage is particularly objectionable because the greater the height of the rotary connector as seen in vertical direction, the larger must be the support, particularly the floating support such as a floating platform or buoy in order to be able to withstand the transversely acting forces which originate. In addition, these known constructions require special means for securing the ship to the buoy or floating platform, and these means are to be provided preferably in the region of the surface of the water.

SUMMARY OF THE INVENTION

It is a general object of the present invention to overcome the aforementioned disadvantages.

More particularly it is an object of the present invention to provide a rotary connector of the type under discussion which is of simpler construction that those heretofore known for the purposes at hand.

An additional object of the present invention is to provide such a rotary connector which is of lesser height than those known from the prior art.

Still another object of the present invention is to provide such a construction which does not necessitate the provision of separate means for securing the ship to the water-based support which also supports the rotary connector.

In pursuance of the above objects, and others which will become apparent hereafter, one feature of my invention resides in the provision of a rotary connector for connecting the ends of multiple conduits. Briefly stated, such rotary connector comprises a housing including a first and a second substantially cup-shaped hollow housing section having respective open sides which face one another. The housing sections are internally subdivided into a plurality of concentric discrete compartments with each compartment of one housing section communicating with the corresponding compartment of the other housing section. Connecting means fluid-tightly connects the housing sections and the respective communicating compartment thereof with freedom of rotary movement of the housing sections relative to one another about an axis concentric with the compartments. A plurality of inlet means on one of said housing sections each communicate with one of the discrete compartments of the respective housing section for admitting thereinto flowable matter discharged from conduits which are to be coupled to the respective inlet means. Finally, a plurality of outlet means are provided on the other of the housing sections and each communicate with one of the discrete compartments of such other housing section for evacuating into conduits which are to be coupled to the respective outlet means such flowable matter as has been admitted into the communicating compartment of the one housing section.

It is particularly advantageous if one of the housing sections is secured to the water-based support, such as the floating platform or buoy, whereas only the other of the housing sections is then rotatable with reference to the secured housing section.

The advantage of the construction according to my present invention is particularly to be seen in the fact that its height in vertical direction, that is in direction normal to the surface of the water, is exceedingly small. In addition, its construction is very simple. The low height significantly reduces the transverse forces which act upon the water-based support, particularly floating platform or buoy, so that the floating body of the buoy can be much smaller than was heretofore possible. The connections between the conduits extending out from shore and the lower one of the housing section is located at a low level so that, if the conduits are sufficiently strong in their construction, it is not necessary to provide separate means for securing the ship to the buoy. This can be further enhanced by providing the openings communicating with the chambers in the upper turnable housing section in such a manner that they extend substantially normal to the axis of rotation, that is substantially horizontal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 4:
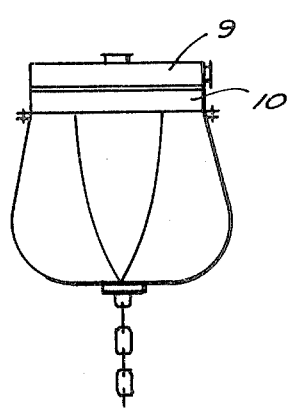
FIG. 4 is a diagrammatic side elevation of a water-based support with a rotary connector according to the present invention mounted thereon.

Discussing now the drawing in detail it will be seen that in FIG. 4 I have shown a water-based support, here illustrated as a so-called can-buoy. The buoy is of course anchored in usual manner, as indicated by the depending chain, and will be understood to be floating in the water offshore. Of course, other buoys, as well as floating platforms and also bollards, may also be used as water-based supports. Mounted on the buoy, as diagrammatically illustrated, is a rotary connector composed of the housing sections 9 and 10. The conduits extending from the connector towards the ship, and those extending from the connector towards land, are not illustrated in FIG. 4 for the sake of simplicity.

Figure 3:
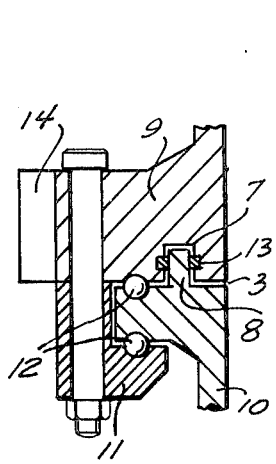
FIG. 3 is an enlarged fragmentary sectional view of a detail of the embodiment in FIGS. 1 and 2.
Figure 1:
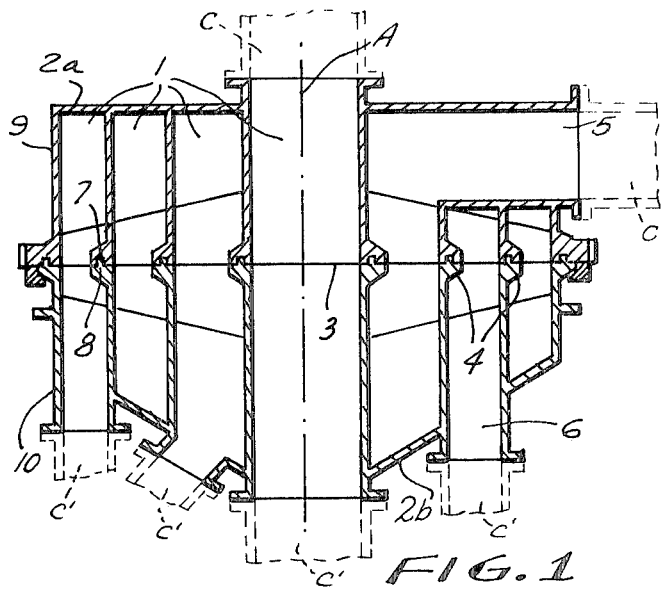
FIG. 1 is a somewhat diagrammatic vertical section through a rotary connector according to the present invention.
Figure 2:
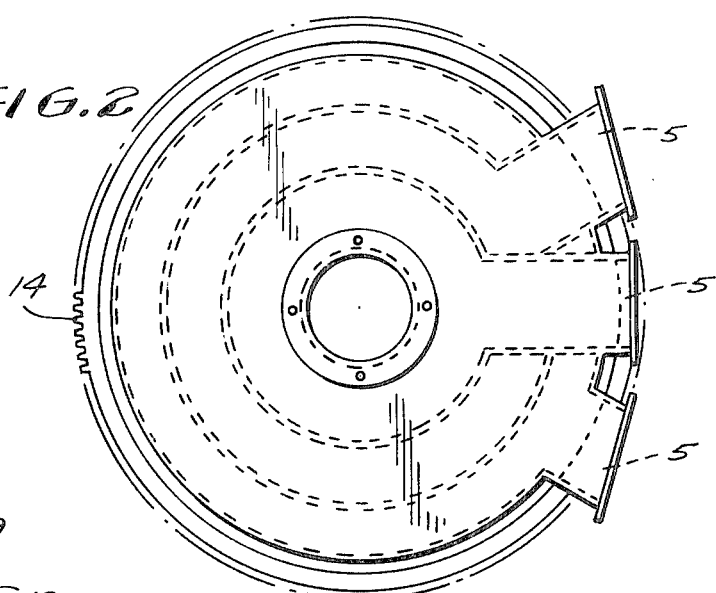
FIG. 2 is a top-plan view of FIG. 1.

The connector is illustrated in more detail in FIGS. 1-3. It will be seen from FIG. 1 that the illustrated connector construction is intended to cooperate with four conduits, that is four conduit sections extending from the connector to the ship and four conduit sections extending from the connector towards land. The connector has a housing composed of an upper section 9 and a lower section 10. Their general shape is substantially cup-shaped and they each have an open side facing a corresponding open side of the other. The interior of the housing sections 9 and 10 is subdivided in each case by a plurality of annular walls 2 into a plurality of concentric compartments 1, which are concentric with the axis of rotation A. The edge faces of the walls 2 and of the outer housing walls are provided with a labyrinthine-type of connecting means, illustrated clearly in FIGS. 1 and 3. It will be seen that the edge faces of the walls on one of the housing sections—here the housing section 9—are provided with at least one circumferentially extending groove 7 whereas the edge faces of the walls of the other housing section—here the one identified with reference numeral 10—are provided with a circumferentially extending projecting bead 8. The bead in each case is received in the corresponding groove 7, and suitable sealing means 13 is provided, such as strips of sealing material, which seals the labyrinthine connections. In this construction the housing sections 9 and 10 have freedom of turning movement relative to one another, while at the same time a fluidtight seal is established between the housing sections 9 and 10 so that the respective compartments 1 provided in these housing sections and communicating with one another as shown in FIG. 1, are each fluid-tightly sealed from the respectively radially inner or radially outer compartment and, in the case of the innermost compartment 1, from the ambient space, that is the water. The connecting means 4 utilizing the grooves 7 and beads 8, permits rotation about the axis A, as already pointed out.

The axis A extends normal to the plane of separation 3 along which the housing sections 9 and 10 contact one another.

In accordance with the present invention the housing section 9 is provided with a plurality of openings whereas the housing section 6 is provided with a plurality of openings 6. Each opening 5 communicates with one of the conduits C shown in broken lines in FIG. 1 and also with one of the compartments 1 in the housing section 9, and similarly each opening 6 communicates with one of the conduits C' shown in broken lines as well as with one of the compartments 1 in the housing section 10. Thus, the composite compartments 1 each of which consists of a compartment section located in the housing section 9 and the compartment section located in the housing section 10, has an opening 5 located at one end and an opening 6 located at its opposite end. The openings 5 and 6 are so constructed that conduits of varying different cross sections can be connected to them. However, this does not form a part of the present invention.

It will be seen that the openings 5 extend substantially normal to the axis A, that is substantially horizontal with respect to the normal position of the rotary connector. This means that each of the openings 5 of the respectively radially inner compartments 1 must be part of a duct which penetrates outwardly through the outer compartments. While this is a relatively expensive way of construction—because evidently each duct must be sealed with respect to the outer compartments 1 which it penetrates—it makes possible a very low overall height of the overall rotary connector, as shown in FIG. 1. How this sealing can be effected is well-known to those skilled in the art and need not be discussed in detail. For instance, welded seams may be provided. In the housing section 10 the openings 6 extend substantially in direction of the axis A, but at least some of them are inclined with reference thereto. Of course, it will be appreciated that the openings 6 could be constructed in the same manner as the openings 5, or that the openings 5 could be constructed in the same manner as the openings 6. The advantage of the openings 6 is that those associated with the inner compartments 1 need not penetrate the respectively outer compartments 1, and therefore need not be sealed with respect to these outer compartments which they penetrate; on the other hand, this construction does necessitate a slight increase in the overall height of the rotary connector. Regardless of how the construction is finally selected, however, it will be seen that the overall height of the rotary connector is so small that the conduit connections to the ship can be used directly for purposes of mooring the ship without requiring special means for this purpose.

In order to absorb the forces which develop when the conduits are used for mooring the ship, while maintaining ready rotatability of the housing sections 9 and 10 with reference to one another, roller bearing means 12 is provided between the outer circumferential walls of the housing sections 9 and 10. This is shown on an enlarged scale in fragmentary detail in FIG. 3. It will be seen that the edge of the housing section 9 projects slightly radially with reference to the edge of the housing section 10 so that a flange-ring 11 can be threadedly connected thereto as shown which supports the roller bearing means 12 and embraces the edge of the housing section 10 as illustrated.

In addition, FIGS. 2 and 3 show that the projecting edge of the housing section 9 is provided with an annulus 14 of teeth (only partly shown in FIG. 2) whose purpose is to permit rotation of the housing section 9 with reference to the housing section 10—which is preferably secured to the water-based support and therefore not rotatable—by bringing a suitable drive arrangement into mesh with the annulus of the teeth 14. Thus, a suitable motor can be provided and gears driven by this motor which in turn mesh with the annulus of teeth 14. The drive may be provided on the water-based support itself. The control of the drive may be effected by activating the drive as a function of the tangential forces which act upon the housing section 9 in response to movements of the ship with reference to the rotary connector.

It will be appreciated that certain modifications can readily be made and are included in the concept of the present invention. Thus, the openings communicating with the compartments 1, particularly the openings 5, may be provided with caps or with self-closing covers to prevent the entry of water when conduits extending from the ship to the rotary connector are disconnected. Also, the connecting means 4 and the sealing means 13 may be of different types than those which have been illustrated, which is also true of the roller bearing means 12, the flange ring 11 in the manner in which the latter is secured to the housing section 9.

It will be understood that each of the elements described above, or two or more together, may also find a useful application in other types of constructions, differing from the types described above.

While the invention has been illustrated and described as embodied in a rotary connector for connecting the ends of multiple conduits, it is not intended to be limited to the details shown, since various modifications and structural changes may be made without departing in any way from the spirit of the present invention.

What is claimed as new and desired to be protected by Letters Patent is set forth in the appended claims.

I claim:

1. A rotary connector for connecting the ends of multiple conduits, comprising a housing having an axis and including a first and a second substantially cup-shaped hollow housing section having respective open sides facing one another, each of said housing sections being of one-piece construction and including an outer wall and a plurality of annular concentric inner walls, said walls each having at said open side an exposed edge face and subdividing the interior of the respective housing section into a plurality of concentric discrete compartments with each compartment of one housing section communicating with a corresponding compartment of the other housing section; connecting means fluid-tightly connecting said housing sections and the respective communicating compartments in a plane of separation which extends transverse to said axis and is common to all of said compartments with freedom of relative rotary movement of said housing sections about said axis, said connecting means comprising at least one circumferentially extending groove on each edge face of the walls of one of said housing sections, and at least one circumferentially extending bead on each edge face of the walls of the other housing section with the respective beads being received in associated grooves; sealing means for each bead and associated groove; a plurality of inlet means on one of said housing sections and each communicating with one of said discrete compartments of said one housing section for admitting flowable matter; liquid admitting first conduits coupled to the respective inlet means, a plurality of outlet means on the other of said housing sections and each communicating with one of said discrete compartments of said other housing section; second conduits coupled to the respective outlet means for receiving therefrom the flowable matter admitted into the communicating compartment of said one housing section; and a water-based support for supporting said connector in a body of water, one of said housing sections being rotatable and the other being nonrotatable and secured to said support.

2. A rotary connector for connecting the ends of multiple conduits, comprising a housing having an axis and including a first and a second substantially cup-shaped hollow housing section each having a partially closed side and an open side with said open sides facing one another and each section thereof being of one-piece construction and including an outer wall and a plurality of concentric annular inner walls, each of said walls having at said open side of the respective section an exposed edge face and said walls subdividing the interiors of the respective sections into a plurality of discrete concentric compartments with each compartment of one section communicating with a corresponding compartment of the other section; connecting means fluid-tightly connecting said sections and the respective communicating compartments in a plane of separation which extends transversely of said axis and is common to all of said compartments with freedom of relative rotary movement of said sections about said axis; sealing means interposed between said sections to separate the compartments in each of said sections from each other but to permit communication between the compartments of one of said sections and the corresponding compartments of the other of said sections; a plurality of inlet means provided on one of said sections and each communicating with one of said compartments in said one section for admitting flowable matter; fluid-admitting first conduit means coupled to the respective inlet means; a plurality of outlet means provided on the other of said sections and each communicating with one of said compartments in said other section; second conduits coupled to the respective outlet means for receiving therefrom the flowable matter admitted into the communicating compartments of said one section; and a water-based support for supporting said connector in a body of water, one of said housing sections being rotatable and the other of said sections being nonrotatable and being secured to said support.

3. A rotary connector as defined in claim 2, said connecting means further comprising roller bearing means interposed between said housing sections.

4. A rotary connector as defined in claim 2, and further comprising rotary-motion receiving means on said rotatable housing section for receiving motion from a drive so as to effect rotation of said rotatable housing section with reference to said nonrotatable housing sections.

5. A rotary connector as defined in claim 2, wherein said rotatable housing section is an upper part of said housing means and said nonrotatable housing section is a lower part of said housing means.

6. A rotary connector as defined in claim 5, wherein said inlet means and said outlet means each comprise port means provided in the respective rotatable housing section extend substantially normal to said axis.

7. A rotary connector as defined in claim 6, wherein said port means in said nonrotatable housing section extend substantially longitudinally of said axis.

* * * * *